US007352693B2

(12) United States Patent
Seid et al.

(10) Patent No.: US 7,352,693 B2
(45) Date of Patent: Apr. 1, 2008

(54) FAULT TOLERANT WIRELESS COMMUNICATION SYSTEMS AND METHODS

(75) Inventors: Howard A. Seid, Ashburn, VA (US); Amrit K. Chandra, Ashburn, VA (US)

(73) Assignee: Nextel Communications Inc., Reston, VA (US)

( * ) Notice: Subject to any disclaimer, the term of this patent is extended or adjusted under 35 U.S.C. 154(b) by 458 days.

(21) Appl. No.: 11/045,095

(22) Filed: Jan. 31, 2005

(65) Prior Publication Data

US 2006/0171394 A1 Aug. 3, 2006

(51) Int. Cl.
*G01R 31/08* (2006.01)

(52) U.S. Cl. ............... 370/216; 370/326; 370/217; 455/418; 455/8

(58) Field of Classification Search ........... 370/216, 370/326, 217; 455/418, 8
See application file for complete search history.

(56) References Cited

U.S. PATENT DOCUMENTS 6,625,420 B1 *  9/2003  Naqvi et al. ............... 455/8
7,002,908 B1 *  2/2006  Lund et al. ................. 370/228
7,058,009 B1 *  6/2006  Skirmont et al. ........... 370/217
2003/0043736 A1 *  3/2003  Gonda ........................ 370/218
2003/0112761 A1 *  6/2003  Sen ............................ 370/242
2004/0032866 A1 *  2/2004  Konda ........................ 370/388
2005/0201272 A1 *  9/2005  Wang et al. ................ 370/216

* cited by examiner

*Primary Examiner*—Danh Le

(57) ABSTRACT

Systems and methods for fault tolerant communication are provided. A base site is coupled to a central office via a channel service unit. The channel service unit is coupled to the central office via primary and secondary communications links. A first and second permanent virtual circuit couple the channel service unit to a wireless carrier core network. When there is a fault on the primary communication link or the primary permanent virtual circuit user network interface of an aggregator, the secondary communication link is established and the secondary permanent virtual circuit is activated. Communications are then routed to the wireless carrier core network via the secondary communication link and the secondary permanent virtual circuit.

20 Claims, 5 Drawing Sheets

FAULT TOLERANT WIRELESS COMMUNICATION SYSTEMS AND METHODS

BACKGROUND OF THE INVENTION

The mobility afforded by wireless communication networks has resulted in increased usage of such networks. Private wireless networks and cellular networks are two common types of wireless communication networks. Private wireless networks, also known as wireless local loop (WLL) networks, are commonly operated by public safety agencies, taxi services and delivery services. Private wireless networks typically operate over a limited range of frequencies and within limited geographic areas. In contrast, cellular networks typically operate over a larger number of frequencies and provide coverage over larger geographic areas.

Although conventional cellular networks may provide sufficient reliability for the average user, there are a number of deficiencies which prevent widespread adoption by public safety agencies. For wireline communication public safety agencies can be provided with dedicated circuits and switches such that even when the Public Switched Telephone Network (PSTN) is overloaded with non-emergency traffic, communications between, and within, public safety agencies can still be completed. To provide reliability to wireless communications, public safety agencies typically employ private wireless networks which operate over frequencies reserved for public safety agencies.

Although these private radio networks reduce the likelihood that calls by public safety agencies are blocked from accessing the radio network, they are expensive to implement and maintain. For example, these networks typically require the use of specialized mobile stations which are more expensive than typical mobile stations, due to the relatively low demand for the specialized mobile stations compared to that of mass-produced mobile stations. As used herein, the term mobile station (MS) is intended to encompass any type of wireless communication device including wireless telephones, wireless Personal Digital Assistants (PDA), wireless pagers, portable computers with wireless modems and the like.

Compared to cellular networks, private wireless networks are more likely to have dead spots where a radio signal cannot be received by the public safety agency worker's mobile station. These dead spots can be extremely hazardous to the public safety agency workers, e.g., a police officer requesting backup, and to the citizenry in general, e.g., a public safety agency worker requesting an ambulance or fire trucks. Accordingly, public safety agencies desire the coverage area provided by conventional cellular networks and the reliability provided by private radio networks.

Figure 1:
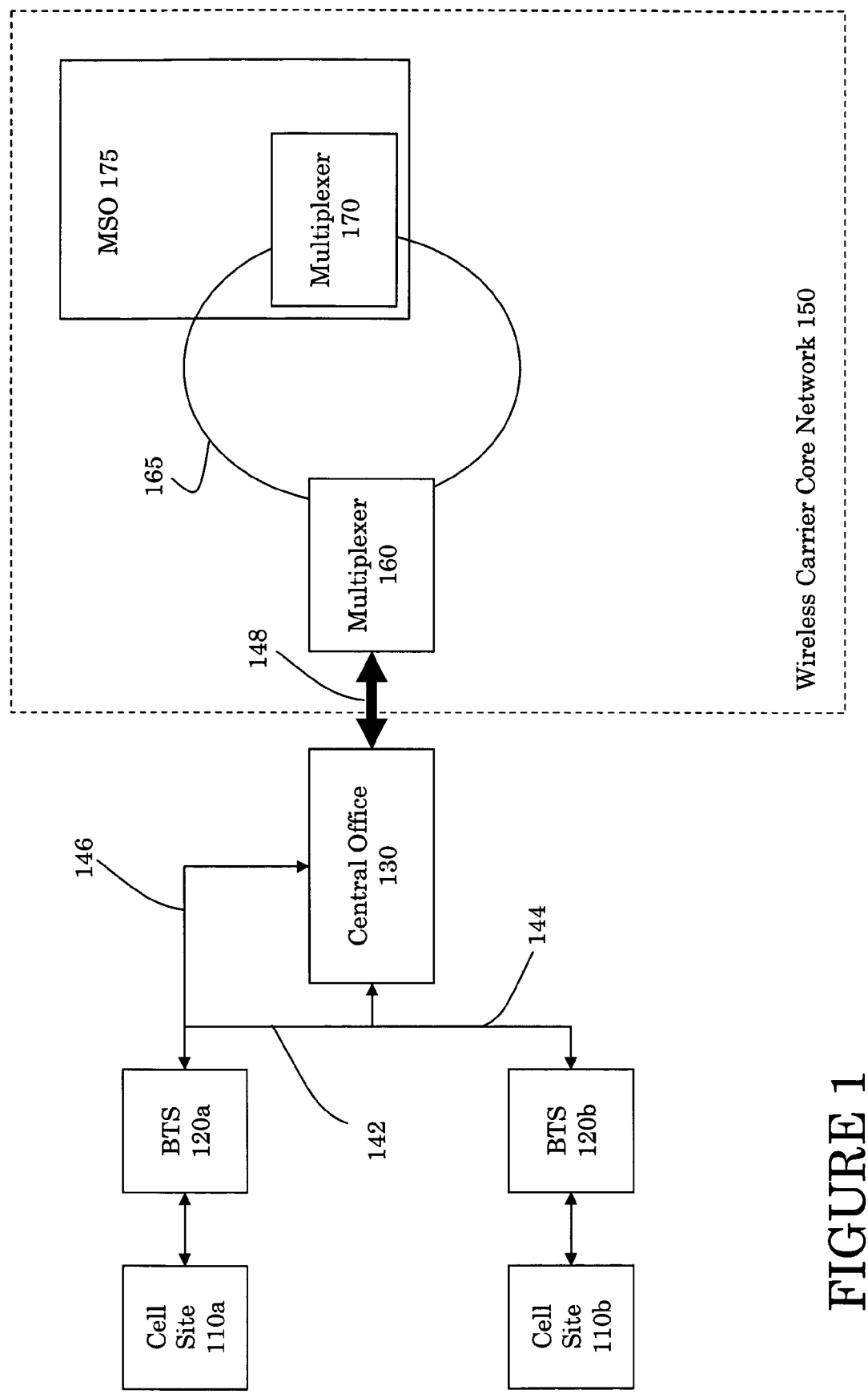

FIG. 1 illustrates a conventional communication network. In the conventional communication network of FIG. 1, a wireless carrier's cell sites 110a and 110b, are respectively coupled to base transceiver stations (BTSs) 120a and 120b. The wireless carrier relies upon connections through a public switched telephone network (PSTN) to provide a backhaul connection between the BTSs and the wireless carrier's core network 150. Specifically, each of the BTSs 120a and 120b are respectively coupled to a central office 130 of the PSTN via communication links 142 and 144. Typically, communication links 142 and 144 are T1 communication links. T1 communication links are digital communication links that have a large bandwidth, i.e., 1.544 Mbps. T1 communication links are leased from a PSTN operator by a wireless carrier, and result in significant monthly recurring costs.

A central office 130 aggregates a number of T1 links and forwards the information to a wireless carrier core network 150 via a high bandwidth communication link 148, such as a channelized digital signal level 3 (DS-3) communication link. A channelized DS-3 communication link carries approximately 44.736 Mbit/sec of information. The wireless carrier core network 150 receives the channelized DS-3 communication link by an add-drop multiplexer 160. The add-drop multiplexer 160 places the information on a network 165, which provides the information to an add-drop multiplexer 170 within a mobile switching office (MSO) 175. The network 165 can be any type of network, e.g., a synchronous optical network (SONET).

If the T1 communication link 142 or 144 between the BTSs 120a and 120b and the central office 130 fails, then all communications for the particular cell site fail because the communications cannot be forwarded to the wireless carrier core network 150. One technique for addressing the failure of the T1 connection is to provide a redundant T1 connection 146. Accordingly, if the T1 connection 142 fails, the BTS 120a can still communicate with the central office 130 using T1 146. However, because the T1 connections are leased, and can be quite costly, when the primary communication link, e.g., T1 142, is operating properly the expense of the secondary communication link, e.g., T1 146, is largely wasted. T1 links between cell sites and central offices do not fail regularly, and accordingly, leasing a redundant T1 connection is a costly way to address a problem which rarely occurs.

Although failure of T1 links rarely occurs, to certain wireless users, such as public safety agencies, high availability is required for any communication network. Accordingly, it would be desirable to provide techniques for fault tolerant wireless communications with a minimum of expense.

SUMMARY OF THE INVENTION

Systems and methods for fault tolerant wireless communication systems are provided. In accordance with the present invention, a base transceiver station is coupled to an aggregator via primary and secondary communication links. Specifically, the base transceiver station is coupled to a channel service unit. The channel service unit is coupled to the aggregator via the primary and secondary communications links. The aggregator is coupled to a switch of a wireless communication core network via a primary and secondary permanent virtual circuit (PVC). When a fault occurs on either the primary communication link or the primary PVC user network interface of the aggregator, the secondary communication link is established and the secondary PVC is activated.

Other objects, advantages and novel features of the present invention will become apparent from the following detailed description of the invention when considered in conjunction with the accompanying drawings.

BRIEF DESCRIPTION OF THE DRAWING FIGURES

Figure 2A:
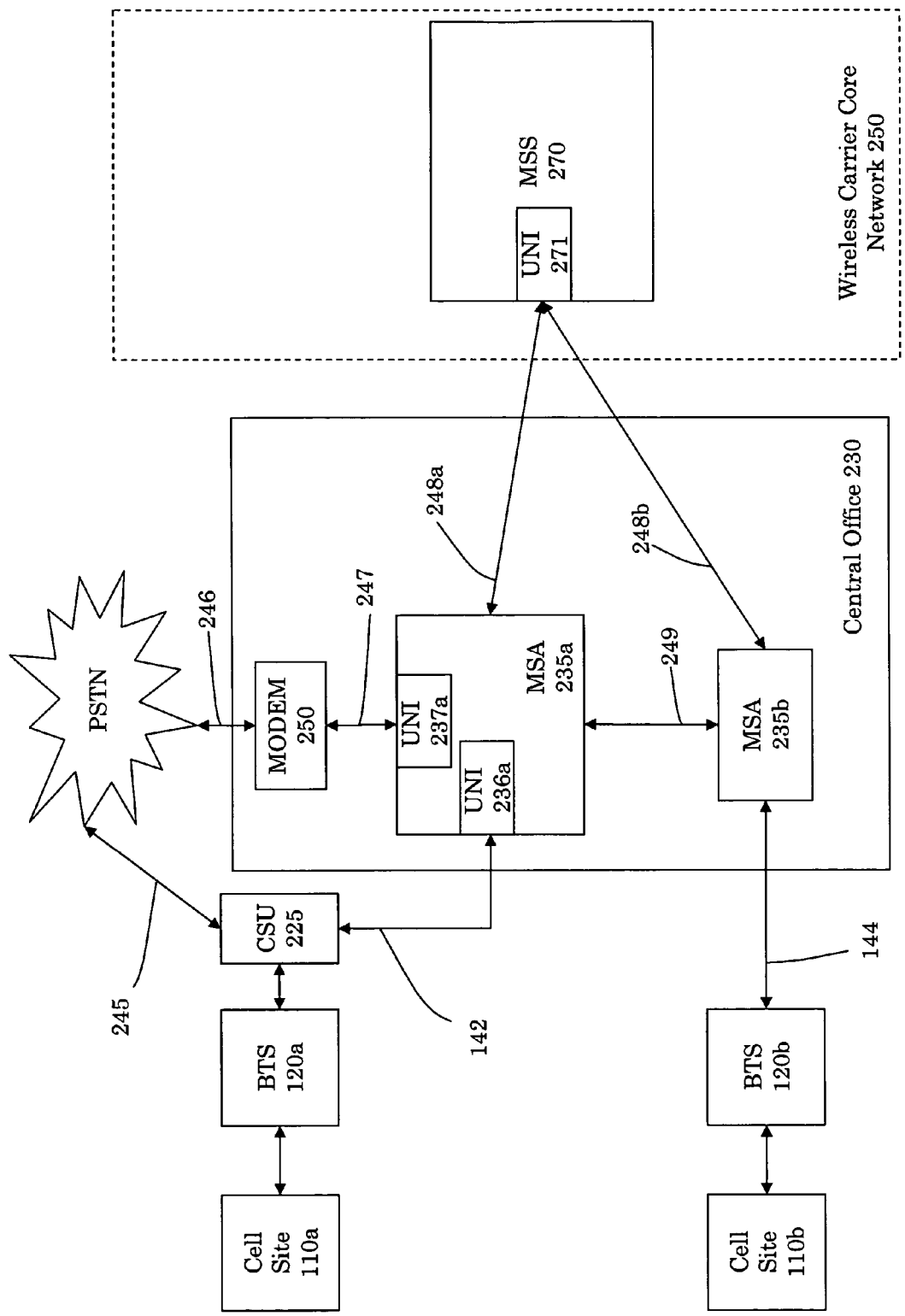
Figure 2B:
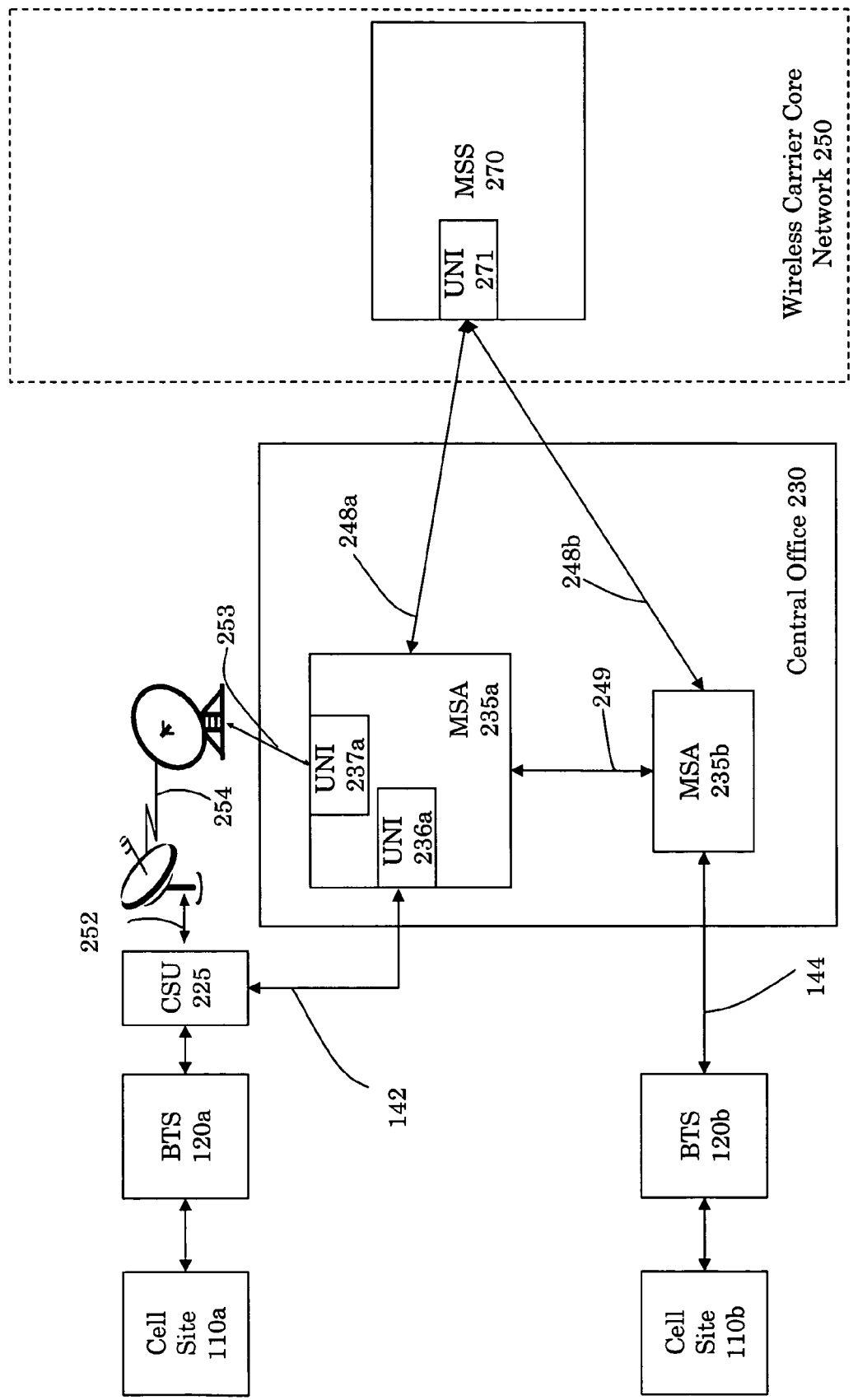
Figure 3A:
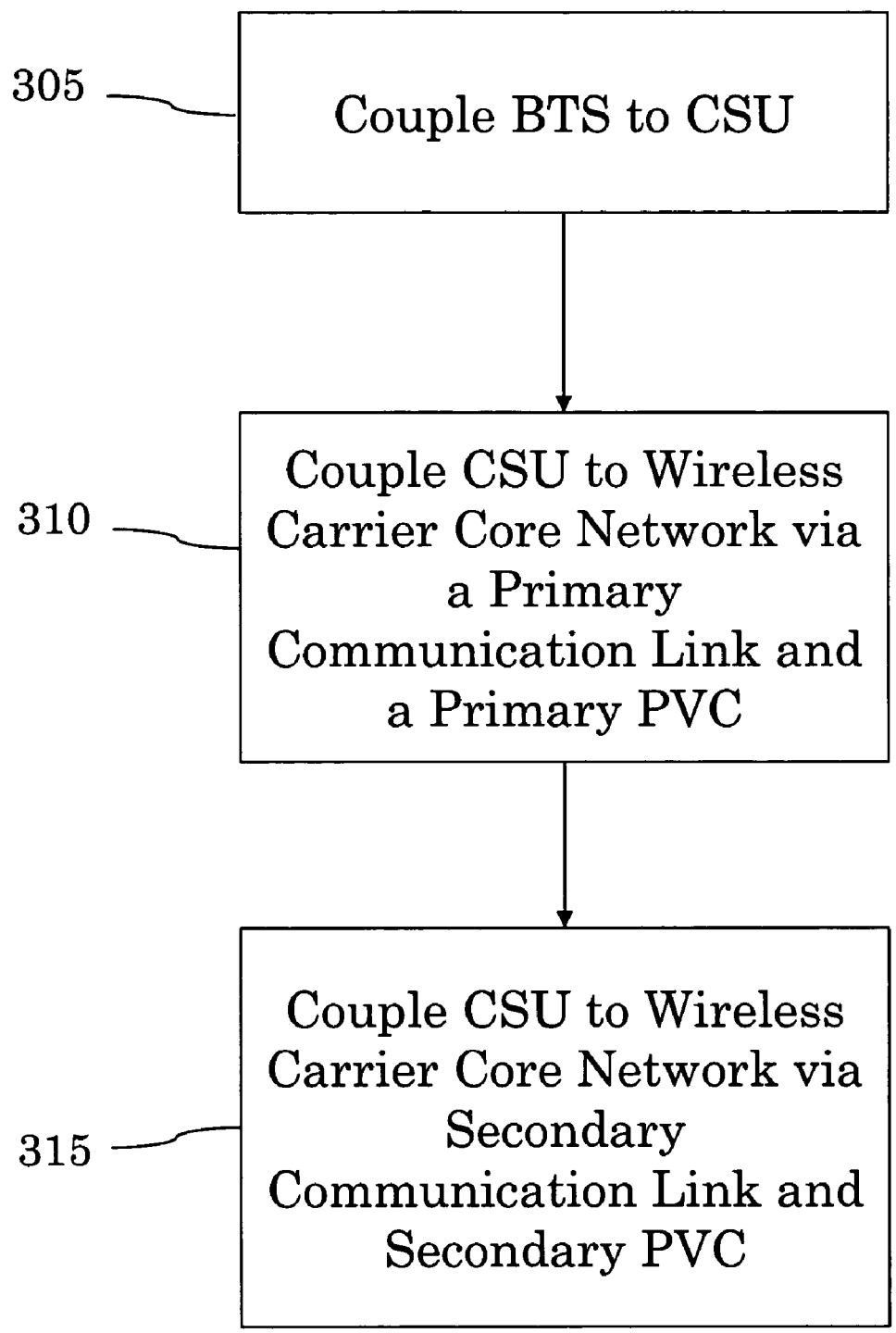
Figure 3B:
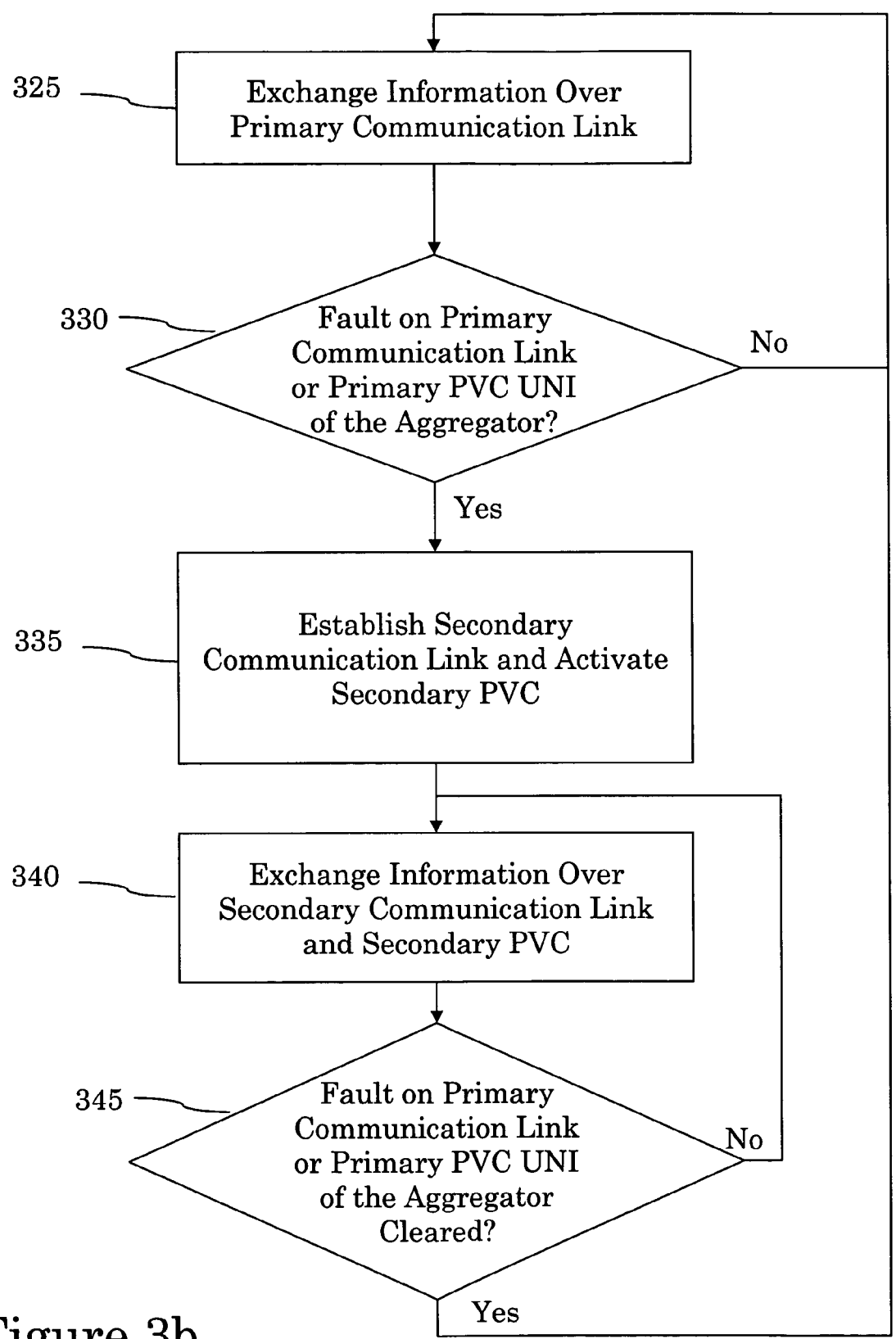

FIG. 1 illustrates a conventional communication system;
FIG. 2a illustrates an exemplary communication system in accordance with one embodiment of the present invention;

FIG. 2*b* illustrates an exemplary communication system in accordance with another embodiment of the present invention;

FIG. 3*a* illustrates an exemplary method for setting-up a fault tolerant communication system in accordance with the present invention; and FIG. 3*b* illustrates an exemplary method for operating a fault tolerant communication system in accordance with the present invention.

DETAILED DESCRIPTION OF THE PREFERRED EMBODIMENTS

FIG. 2*a* illustrates an exemplary communication system in accordance with one embodiment of the present invention, in which elements with the same reference numerals as FIG. 1 have the same function as that described above in connection with FIG. 1. In FIG. 2*a* cell site 110*a* is a fault tolerant cell site, while cell site 110*b* is not a fault tolerant cell site. In accordance with one aspect of the present invention, fault tolerance is achieved, in part, using channel service unit (CSU) 225. The CSU 225 can be any type of CSU that supports a primary T1 communication link and an ISDN primary rate interface (PRI) through a dial-up modem for a secondary communication link, e.g., those manufactured by Paradyne Corporation of Largo, Fla.

CSU 225 couples BTS 120*a* to the central office 230 via a primary 142 and secondary 245-247 communication links. The primary communication link 142 can be, for example, a T1 communication link. The secondary communication link can be an ISDN PRI communication link. The primary and secondary communication links are coupled to user network interfaces (UNIs) on different ports of the equipment in the central office. When the primary communication link 142 fails, the CSU 225 dials into modem 250, thereby establishing communications links 245 and 246. Modem 250 is coupled to equipment in the central office 230 via communication link 247 which is typically an extremely reliable local connection within the central office. Although FIG. 2*a* illustrates only a single cell site being coupled to modem 250, the modem 250 can support a number of cell sites, effectively providing one-for-n redundancy.

Because the ISDN PRI communication link is much cheaper to maintain then a T1 link, a fault tolerant communication system is provided with a minimal additional cost for the redundant communication link. Specifically, ISDN communication links typically require a small recurring charge for access and additional charges based upon actual usage.

The central office 230 includes multi-service aggregators (MSA) 235*a* and 235*b*, e.g., ATM switches or IP routers. MSA 235*a* is coupled to CSU 225 via a T1 communication link 142 and modem 250. Specifically, CSU 225 is coupled to the PSTN via communication link 245. The PSTN is coupled to modem 250 via communication link 246, and the modem 250 is coupled to the MSA 235*a* via communication link 247. Communication links 142 and 247 are coupled to UNIs 236*a* and 237*a* on different ports on the MSA 235*a*. The different ports and UNIs can be on the same or different cards of the MSA 235*a*. Coupling the communication links 142 and 247 to different cards on the MSA 235*a* (if applicable), provides additional fault tolerance such that if the port or UNI on the MSA 235*a*, which is coupled to the primary communication link 142, fails due to a port, UNI or card failure, the secondary communication link 247 is not affected because it is coupled to a different card. MSA 235*b* is coupled to BTS 120*b* via a single T1 communication link 144.

A primary permanent virtual circuit (PVC) is established between MSA 235*a* and a multi-service switch (MSS) 270 for the communications received over the primary communication link 142, and a secondary PVC is established for communications received over the secondary communication link 245-247. Specifically, the primary PVC is established between UNI 236*a*, where the primary communication link 142 is coupled to MSA 235*a*, and UNI 271 of MSS 270. Similarly, the secondary PVC is established between UNI 237*a*, where communication link 247 is coupled to MSA 235*a*, and UNI 271 of MSS 270, which is the same UNI as is used to terminate the primary PVC. The network protocol used to implement the PVCs between the MSA 235*a* and the MSS 270 can be frame relay, asynchronous transfer mode (ATM), internet protocol/multi-protocol label switching (IP/MPLS), or the like.

When the primary communication link or the primary PVC UNI 236*a* fails, the MSA 235*a* activates the corresponding secondary PVC. The secondary PVC uses the same external bandwidth and path which were previously reserved for the failed primary PVC. As used herein, the external bandwidth and path refers to the bandwidth and path between an MSA and UNI 271 on the MSS.

Because the primary PVC has already reserved bandwidth on a route to MSS 270, the secondary PVC requires no reserved allocation of bandwidth on communication link 248*a*. Bandwidth on the connections between MSA 235*a* and MSS 270 is thus conserved by activating the secondary PVC only when the primary communication link or primary PVC UNI of an aggregator fails. Additionally, if both the primary and secondary PVCs were always active, the secondary PVC could have a sub-optimal path setup to the MSS 270 because of the bandwidth reserved by the primary PVC.

To achieve one-for-n redundancy, each of the n cell sites which are to be protected by a secondary PVC use the same UNI 237*a* that terminates link 247 on MSA 235*a*. Each of the n primary PVCs is established between n different UNIs on MSA 235*a*, e.g., UNI 236*a* for exactly one of the n primary PVCs, and an associated UNI of MSS 270, to establish connectivity and reserve bandwidth required for communication. There does not have to be a unique UNI on MSS 270 for each of the n unique UNIs of the primary PVCs on MSA 235*a*. For each such primary PVC, a corresponding secondary PVC is created between the UNI 237*a* and the same UNI of MSS 270 that terminates the corresponding primary PVC. Accordingly, one-for-n redundancy is achieved by connecting the primary PVCs to different UNIs of the aggregator, and all of the secondary PVCs to the same UNI on an aggregator port that is different from the aggregator ports that are used by any of the primary PVCs.

The MSAs 235*a* and 235*b* are coupled to each other via communication link 249. MSAs 235*a* and 235*b* are coupled to MSS 270 via communication links 248*a* and 248*b*, respectively. The communication link 249 between MSA 235*a* and 235*b* provides additional redundancy to the system. Specifically, if communication link 248*a* between MSA 235*a* and MSS 270 fails, MSA 235*a* can route the communications to MSA 235*b* via communication link 249. The communications received by MSA 235*a* are routed by MSA 235*b* to MSS 270 via communication link 248*b*. The network protocols used to implement the PVCs between the MSA 235*a* and the MSS 270 can be frame relay, ATM, IP/MPLS, or the like, provided that the MSA 235*b* is the same type of equipment as MSA 235*a*.

FIG. 2a illustrates MSAs 235a and 235b as being located in the same central office 230. In such a case, communication link 249 between the MSAs can be a patch cable. However, MSAs 235a and 235b can be located in different central offices. Accordingly, the MSAs can be coupled to each other using a DS-3, OC-3 or any other type of connection of sufficient bandwidth.

FIG. 2b illustrates an exemplary communication system in accordance with another embodiment of the present invention, in which elements with the same reference numerals as FIG. 2a have the same function as that described above in connection with FIG. 2a. In this embodiment, CSU 225 activates a wireless link on failure of T1 communication link 142. This wireless link comprises link 252, which connects the CSU 225 to a local cell site antenna, link 253, which connects an antenna to MSA 235a, and a radio link 254 between the two antennas. The radio link 254 can be a microwave, 802.16 or other similar type of communication link. Although FIG. 2b illustrates only a single cell site being coupled to the antenna which is attached to MSA 235a, this antenna can support a number of cell sites effectively providing one-for-n redundancy.

FIG. 3a illustrates an exemplary method for setting-up a fault tolerant communication system in accordance with exemplary embodiments of the present invention. For each cell site which is to be fault tolerant, the BTS is coupled to the CSU via a communication link (step 305). The CSU is coupled to a wireless carrier core network via a primary communication link and a primary PVC (step 310). The CSU is also coupled to the wireless carrier core network via a secondary communication link and secondary PVC (step 315).

FIG. 3b illustrates an exemplary method for operating a fault tolerant communication system in accordance with the present invention. The CSU exchanges information over the primary communication link and primary PVC (step 325). If there are no faults along the primary communication link or the primary PVC UNI of the aggregator ("No" path out of decision step 330), then the CSU continues to exchange information over the primary communication link and primary PVC (step 325). If, however, there is a fault on the primary communication link or the primary PVC UNI of the aggregator ("Yes" path out of decision step 330), then the secondary communication link is established and secondary PVC associated with the primary PVC is activated (step 335). As discussed above, the secondary PVC uses the external bandwidth and path previously reserved for the primary PVC. Once the secondary communication link is established and secondary PVC is activated, the CSU exchanges information over the secondary communication link and secondary PVC (step 340).

If the fault on the primary communication link or the primary PVC UNI of the aggregator has not been cleared ("No" path out of decision step 345), then the CSU continues to exchange information over the secondary communication link and secondary PVC (step 340). If, however, the fault on the primary communication link or the primary PVC UNI of the aggregator has been cleared ("Yes" path out of decision step 345), then the CSU exchanges information over the primary communication link and primary PVC (step 325).

The method described above in FIG. 3b in connection with the CSU is equally applicable to the MSAs. Specifically, when there is a communication link between the MSAs, the MSAs can determine whether a fault exists on the communication link to the MSS. When a fault occurs between the MSA and the MSS, the MSA will then forward the communications to another MSA, which will forward the communications to the MSS. Once the fault between an MSA and the MSS has been cleared, the MSA will then return to routing communications to the MSS over its primary communication link.

Although exemplary embodiments of the present invention have been described with a primary communication link being a T1 communication link and a secondary communication link being an ISDN or wireless communication link, the present invention can also employ other types of primary and secondary communication links, as long as they have sufficient bandwidth to support communications to and from the cell site. For example, the primary communication link can be an E1 communication link with a secondary communication link being an ISDN communication link, or the primary and secondary communication links can both be wireless communication links.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system, comprising:
    a base transceiver station;
    a channel service unit coupled to the base transceiver station;
    an aggregator coupled to the channel service unit via a primary and secondary communication link; and
    a switch coupled to the aggregator via a primary and secondary permanent virtual circuit, wherein the secondary communication link is established, and the secondary permanent virtual circuit is activated, when the primary communication link fails, and wherein the aggregator is coupled between the channel service unit and the switch.

2. The system of claim 1, wherein the primary link is a T1 communication link and the secondary link is an ISDN or wireless communication link.

3. The system of claim 2, wherein the wireless communication link is a microwave or 802.16 communication link.

4. The system of claim 1 further comprising:
    another base transceiver station;
    another channel service unit coupled to the another base transceiver station,
    wherein the another channel service unit is coupled to the aggregator via another primary and secondary communication link, and the aggregator is coupled to the switch via another primary and secondary permanent virtual circuit.

5. The system of claim 4, wherein the another secondary communication link is coupled to a same user network interface of the aggregator as the secondary communication link.

6. The system of claim 1, wherein the secondary permanent virtual circuit is activated when the primary communication link fails or there is a fault on the primary permanent virtual circuit user network interface of the aggregator.

7. The system of claim 1, further comprising:
    another aggregator, wherein the another aggregator is coupled to the switch, and is coupled to the aggregator via a third communication link.

8. The system of claim 7, wherein the aggregators are multi-service aggregators and the switch is a multi-service switch.

9. The system of claim 7, wherein when a fault occurs on a communication link between the aggregator and the switch, the aggregator forwards communications over the third communication link, and the another aggregator forwards the communications to the switch.

10. The system of claim 7, wherein the first and second aggregators communicate with the switch using frame relay, asynchronous transfer mode (ATM), or internet protocol/multi-protocol label switching (IP/MPLS) protocol.

11. The system of claim 1, wherein the primary and secondary communication links are coupled to user network interfaces on different ports on the aggregator.

12. A method for communicating between a base site and a wireless carrier core network, the method comprising the acts of:
    forwarding, by a base site, communications over a primary communication link and a primary permanent virtual circuit to the wireless carrier core network;
    determining whether there is a fault on the primary communication link or the primary permanent virtual circuit user network interface of an aggregator;
    establishing a secondary communication link and activating an established secondary permanent virtual circuit when it is determined that there is a fault On the primary communication link or the primary permanent virtual circuit user network interface of the aggregator; and
    forwarding the communications over the secondary communication link and the secondary permanent virtual circuit when it is determined that there is a fault on the primary communication link or the primary permanent virtual circuit user network interface of the aggregator, wherein the secondary permanent virtual circuit uses an external bandwidth and path which was previously used by the primary permanent virtual circuit.

13. The method of claim 12, wherein the primary communication link is a T1 communication link and the secondary communication link is an ISDN or wireless communication link.

14. The method of claim 13, wherein the wireless communication link is a microwave or 802.16 communication link.

15. A method for providing a fault tolerant wireless communication network, the method comprising the acts of:
    coupling a channel service unit of a base site to an aggregator via a primary communication link;
    coupling the aggregator to a switch of a wireless carrier core network via a primary permanent virtual circuit;
    coupling the channel service unit of the base site to the aggregator via a secondary communication link; and
    coupling the aggregator to the switch of the wireless carrier core network via a secondary permanent virtual circuit, wherein the aggregator is coupled between the channel service unit of the base site and the switch.

16. The method of claim 15, wherein the primary communication link is a T1 communication link and the secondary communication link is an ISDN or wireless communication link.

17. The method of claim 15, wherein the wireless communication link is a microwave or 802.16 communication link.

18. The method of claim 15, further comprising the act of:
    coupling n additional base sites to the wireless carrier core network via n additional primary communication links and n additional primary permanent virtual circuits, wherein n is greater than or equal to one.

19. The method of claim 18, further comprising the act of:
    coupling n additional secondary permanent virtual circuits between an aggregator and a switch, wherein each of the n additional secondary permanent virtual circuits corresponds to one of the n additional primary virtual circuits and terminate at a same user network interface on the switch as the corresponding additional primary virtual circuit.

20. The method of claim 19, wherein each of the n additional primary permanent virtual circuits are coupled to different user network interfaces of the aggregator.

* * * * *